March 17, 1936. R. N. KIRCHER 2,034,438
MEANS FOR ATTACHING POURING SPOUTS TO VESSELS
Filed July 30, 1932
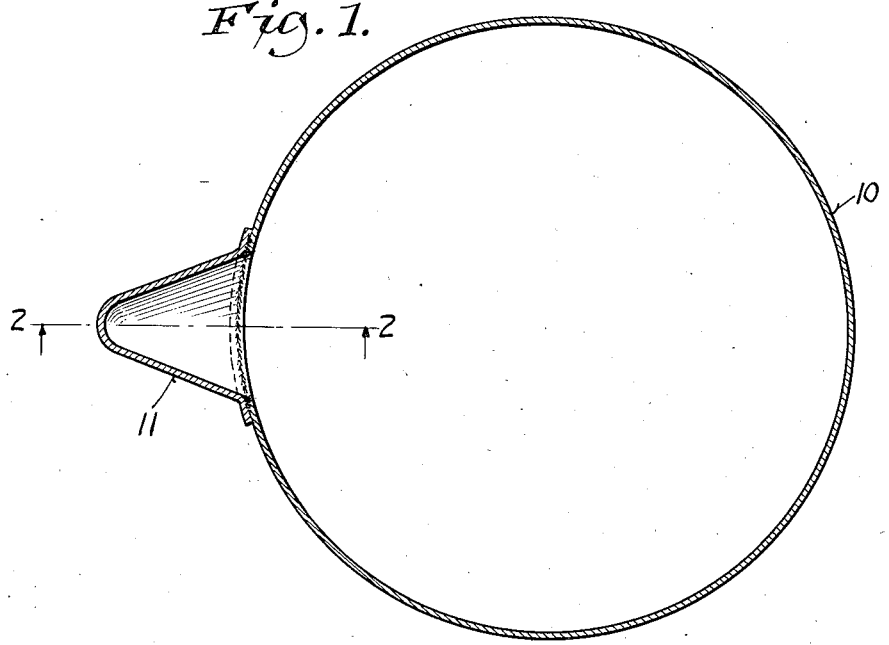
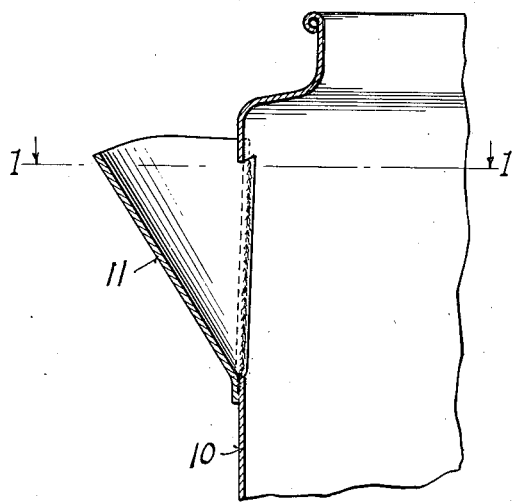
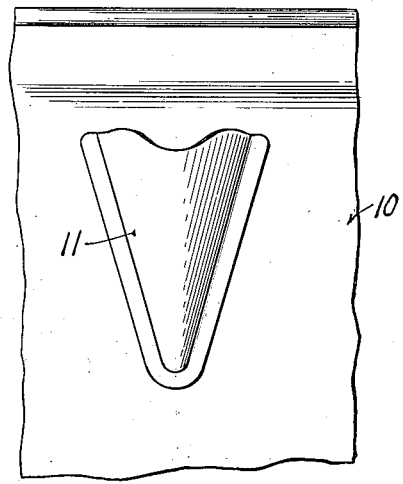
INVENTOR.
Ralph N. Kircher
BY
ATTORNEY.

Patented Mar. 17, 1936

2,034,438

UNITED STATES PATENT OFFICE 2,034,438

MEANS FOR ATTACHING POURING SPOUTS TO VESSELS

Ralph N. Kircher, West Bend, Wis., assignor to West Bend Aluminum Company, West Bend, Wis., a corporation of Wisconsin Application July 30, 1932, Serial No. 626,569

2 Claims. (Cl. 53—3)

My invention relates to the manner of attaching pouring spouts to vessels, and it has been designed particularly for use in connection with the manufacture of coffee pots, drawn or spun from sheets of aluminum.

In the manufacture of coffee pots of the character mentioned, the spout has heretofore been attached to the coffee pot by welding from the outside. This is the most particular operation involved in the manufacture of such pots, and requires the exercise of the highest skill, in order that perfect work may be produced and loss through rejections be reduced to a minimum.

The cost of cutting or grinding away from the exterior surface of the pot, of the excess of metal deposited in the welding operation to secure symmetry of contour, and also the buffing of the milled or ground surfaces to produce a uniform finish, is more than one-half of the whole cost of production, not including losses by reason of rejection for imperfections, which latter sometimes are unavoidable despite the exercise of the most watchful care.

According to my invention, the spout is attached to the coffee pot, by welding from the inside. This practice eliminates the costly operations of grinding away the excess deposits of metal and the buffing of the milled surfaces, as well as the defects which heretofore have sometimes required the rejection of completed work.

As practiced, my invention enables me to produce a coffee pot in which the mill finish of the aluminum plate is preserved. The symmetry is not disturbed, for no mechanical operation is performed exteriorly of the coffee pot in attaching the spout thereto.

Having thus outlined the nature and purposes of my invention, I will now proceed with a specific description of the same, and will point out the novelty in the appended claims.

In the accompanying drawing:

Figure 1 is a view looking toward the top of a coffee pot having the spout attached in accordance with my invention.

Fig. 2 is a sectional view on the line 2—2, Fig. 1, looking in the direction of the arrows; and Fig. 3 is a view in elevation, looking from the left of Fig. 1.

In the drawing, the coffee pot is indicated by the numeral 10, and the attached spout by the numeral 11.

One side of the pot 10 is provided with a triangular opening of general V-shape. In elevation, viewing Fig. 3, the spout 11 is correspondingly shaped, so that the inclined, upwardly diverging edges of the V-opening in the side of the coffee pot are parallel with the corresponding edges of the spout. When the spout is positioned upon the pot, the V-edges of the spout slightly overlap those of the V-opening in the pot and form between themselves an inside angle or recess interior to the outer surface defined by the jointure of the spout and the pot, as indicated in Fig. 1. The overlapping parallelism is continued around the point of convergence.

When the spout 11 is positioned on the pot 10 as previously described it is preferable to limit the exposed portion of the over-lapped edge of the V-opening in the pot 10 to an amount equal to the gauge of the metal from which the pot 10 is formed. In welding, the welding metal is fused into the inside angle or recess so as to fill the same, and unite the spout to the pot as an integral part of the same. In the welding operation, the overlapping edges are fused together and the weld is completely interior to the outer surface defined by the spout and pot. With the exercise of skill in welding, there will be no deposit of excess metal, and consequently milling or grinding is not required.

As stated before, the practice of the invention produces a new result, in that the mill finish of stock is not disturbed, and this is a very desirable accomplishment. In addition to the improved structure produced, the lessening of the time required in the performance of the several operations, has enabled me to speed up production, at a greatly reduced cost.

Having thus described my invention, what I claim and desire to secure by Letter Patent of the United States, is:

1. A coffee pot having an opening in one side, a spout disposed over said opening, the edges of the spout and the edges of the opening overlapping to define a recess interiorly of the outer surface of the spout, and a weld within said interior recess and between the surfaces bounding the same whereby the spout is secured to the pot without disturbing the mill finish of the stock.

2. A coffee pot having a pouring opening, a pouring spout disposed over said opening and having a marginal flange overlapping the outside of the marginal edge of the opening and defining an inside angle therewith, and a weld in said inside angle between said marginal flange and said marginal edge.

RALPH N. KIRCHER.